US007562199B2

(12) United States Patent
Kobara

(10) Patent No.: US 7,562,199 B2
(45) Date of Patent: Jul. 14, 2009

(54) METHOD, APPARATUS AND PROGRAM FOR MANAGEMENT OF ACCESS HISTORY, STORAGE UNIT, AND INFORMATION PROCESSING APPARATUS

(75) Inventor: Makoto Kobara, Tokyo (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 351 days.

(21) Appl. No.: 11/529,229

(22) Filed: Sep. 29, 2006

(65) Prior Publication Data

US 2007/0079084 A1     Apr. 5, 2007

(30) Foreign Application Priority Data

Sep. 30, 2005    (JP)    ............ P2005-287418

(51) Int. Cl.
G06F 12/00    (2006.01)
(52) U.S. Cl. ...................................... 711/154
(58) Field of Classification Search ........................ None
See application file for complete search history.

(56) References Cited

U.S. PATENT DOCUMENTS

| 6,401,180 | B1* | 6/2002 | Hartmann | ............. 711/167 |
| 6,535,953 | B1  | 3/2003 | Kakiuchi | |
| 7,430,637 | B2* | 9/2008 | Mikami | ............. 711/118 |

FOREIGN PATENT DOCUMENTS

| CN | 1327554 A   | 12/2001 |
| JP | 8-179974    | 7/1996  |
| JP | 11-85571    | 3/1999  |
| JP | 2000-29751  | 1/2000  |
| JP | 2000-57012  | 2/2000  |
| JP | 2000-163281 | 6/2000  |
| JP | 2004-13327  | 1/2004  |
| JP | 2005-018738 | 1/2005  |

OTHER PUBLICATIONS

Notification of the First Office Action issued by the Chinese Patent Office on Nov. 16, 2007, for Chinese Patent Application No. 2006101399654, and English-language translation thereof.

(Continued)

*Primary Examiner*—Hiep T Nguyen
(74) *Attorney, Agent, or Firm*—Finnegan, Henderson, Farabow, Garrett & Dunner, L.L.P.

(57) ABSTRACT

A method for management of access history according to the embodiment includes: storing a write command including write time and a write address of write access and a write payload in a storage unit of write access history when the write access occurs; storing a read command including read time and read address of read access in a storage unit of read access history when the read access to the target storage unit occurs; and extracting the read command related to request time included in a read access acquisition request from the storage unit of read access history when the read access acquisition request occurs, extracting the write payload associated with the write time soonest before the request time and the read address included in the extracted read command from an appending section of write access history, and outputting read access information generated from the extracted read command and the extracted write payload.

18 Claims, 15 Drawing Sheets

OTHER PUBLICATIONS

Notification of Reasons for Rejection issued by the Japanese Patent Office on Mar. 3, 2009, for Japanese Patent Application No. 2005-287418, and English-language translation thereof.

Mizuno, "Register Trace Device of MPU," Toshiba Technical Publication (Jun. 28, 1999), 17-40:15-27.

* cited by examiner

| COMMAND | | | PAYLOAD |
|---|---|---|---|
| COMMAND TYPE | WRITE TIME | WRITE ADDRESS | |
| WRITE | $t_1$ | 1 | $a_1$ |
| WRITE | $t_2$ | 2 | $b_1$ |
| WRITE | $t_3$ | 3 | $c_1$ |
| WRITE | $t_4$ | 4 | $d_1$ |
| WRITE | $t_7$ | 1 | $a_2$ |

| COMMAND | | |
|---|---|---|
| COMMAND TYPE | READ TIME | READ ADDRESS |
| READ | $t_5$ | 1 |
| READ | $t_6$ | 3 |
| READ | $t_8$ | 4 |
| READ | $t_9$ | 1 |

METHOD, APPARATUS AND PROGRAM FOR MANAGEMENT OF ACCESS HISTORY, STORAGE UNIT, AND INFORMATION PROCESSING APPARATUS

CROSS REFERENCE TO RELATED APPLICATIONS

This application claims benefit of priority under 35 USC §119 to Japanese Patent Application No. 2005-287418 filed on Sep. 30, 2005, the entire contents of which are incorporated by reference herein.

BACKGROUND OF THE INVENTION

1. Field of the Invention

The present invention pertains to a method, an apparatus and a program for management of access history, a storage unit, and an information processing apparatus, in order to obtain the read access history for a target storage unit.

2. Description of the Related Art

A request for forensic technologies has increased as development of an information processing apparatus in recent years. The forensic declares a series of a scientific search method and technology which performs preservation of evidence and research/analysis of an electromagnetic record, and performs analysis/data gathering, etc. such as the falsification and damage of the electromagnetic record, to an incident response and legal dispute/lawsuits. Here, the incident response declares response to unauthorized use of resources and environments on a computer and a network, etc., service sabotage, destruction of data, disclosure of information not intended etc., and action (incident) etc. to arrive at them etc. According to such the forensic technologies, computer security can be maintained to positive by secure of the digital evidence being attempted.

As one of the technologies of this forensic, an apparatus which can prevent leakage of information or know contents of the leaked data accurately is proposed in the world on the network. However, there are various problems and achievement has been difficult in the storage unit such as disk drives when it tried to introduce a similar method.

Moreover, an apparatus which stores all of write data to the storage unit and retrieves arbitrary historical data is proposed. However, it is difficult to retrieve access history of read processes since there are explosively a lot of generating frequencies of the read processes compared with the write processes.

For example, FIG. 1 shows an access history management apparatus 900 which can collect/retrieve the read/write access history. The access history management apparatus 900 can collect or retrieve the history of the read access and the write access to a target storage unit 951 of an accessible read/write from a user by an access section 911 and an access surveillance section 912. The history of the write access is stored in a storage unit of write access history 901 by a management section of a write access history 913. The history of the read access is stored in a storage unit of read access history 902 by a management section of read access history 914. Here, the access history includes a required operation instruction or an operation response, a command including a request or response time, etc., and a payload including write data or read data. In the prior art shown in FIG. 1, the read access or the write access for the storage unit is monitored, and this is stored as the history of the read access or the write access without modification.

On the other hand, there is continuous data protection technology as the technology which applies to a backup by collecting a change of a history of a storage unit. As an example of this technology, a storage system which enables a data storage service for a user in order to execute an application is disclosed in Japanese patent Laid Open Publication (Kokai) No. 2005-18738. The system disclosed in Japanese patent Laid Open Publication (Kokai) No. 2005-18738 executes snap shot operation and journaling, and executes an additional data processing to recover loss data. The snap shot and the journal entry are separately stored with for production data volume of the user. An older journal entry is retrieved in order to make a new journal entry. This retrieving is achieved by applying one or older journal entries to the corresponding snap shot, and updating this snap shot. The subsequent loss data is recovered by accessing the predetermined snap shot, applying the journal entry to this snap shot, and regenerating the desired state of data.

However, a practicable technology which corresponds to the forensic technology to store information of the read access and the write access at past, and a mapping etc. of the storage unit in a past point is not proposed.

For example, in the technology shown in FIG. 1, it is necessary to store all of each command and the payload as the read access history and the write access history. However, since the read access is more overwhelmingly in the use field of a general storage unit compared with the write access, the read access history is increased unreasonably. Therefore, since the enormous storage capacity for the collection of the read access history is needed, it is difficult to collect the read history or unreal from the cost performance, etc.

In this manner, the enormous storage capacity of the read access history collection is needed in the prior art. Therefore, there has been a fact that storing the read access history is determined it is unreal from the cost performance, and not introduced easily.

SUMMARY OF THE INVENTION

Therefore, the present invention aims providing with a method, an apparatus and a program for management of the access history, a storage unit, and an information processing apparatus, in order to store the read access history by using few memory capacities and obtain the history of the read access.

To solve the above-mentioned problem, the first characteristic of the present invention is related to the method for management of access history in order to obtain read access history for a target storage unit. The access history management method according to the first characteristic of the present invention includes the step of: storing a write command including write time and a write address of write access and a write payload in a storage unit of write access history when the write access to the target storage unit occurs; and storing a read command including read time and read address of read access in a storage unit of read access history when the read access to the target storage unit occurs.

The second characteristic of the present invention is related to the apparatus for management of access history in order to obtain read access history for a target storage unit. The apparatus for management of access history according to the second characteristic of the present invention includes: the target storage unit; an appending section of write access history configured to store a write command including write time and a write address of write access and a write payload in a storage unit of write access history when the write access to the target storage unit occurs; and an appending section of read access history configured to store a read command including read time and read address of read access in a storage unit of read access history when the read access to the target storage unit occurs.

The third characteristic of the present invention is related to the program for management of access history in order to obtain read access history for a target storage unit. The computer executable program for management of access history according to the third characteristic of the present invention comprises: storing a write command including write time and a write address of write access and a write payload in a storage unit of write access history when the write access to the target storage unit occurs; and storing a read command including read time and read address of read access in a storage unit of read access history when the read access to the target storage unit occurs.

The fourth characteristic of the present invention is related to the storage unit in order to obtain access history. The storage unit according to the fourth characteristic of the present invention includes the control program storage unit configured to store the control program realizable as firmware, the control program comprises: storing a write command including write time and a write address of write access and a write payload in a storage unit of write access history when the write access to the storage unit occurs; and storing a read command including read time and read address of read access in a storage unit of read access history when the read access to the storage unit occurs.

The fifth characteristic of the present invention is the information processing apparatus for management of file information of a target storage unit, the information processing apparatus including a file system section in order to obtain read access history. The information processing apparatus according to the fifth characteristic of the present invention includes: an appending section of write access history configured to store an update command including update time and an update address of update access and an update payload in a storage unit of write access history when the update access to the target storage unit occurs; an appending section of read access history configured to store a read command including read time and read address of read access in a storage unit of read access history when the read access to the target storage unit occurs; and a read access reconfiguration section configured to extract the read command related to request time from the storage unit of read access history when the read access acquisition request occurs, extract the write payload related to the write time soonest before the request time and the read address included in the extracted read command from the appending section of write access history, and then generate read access information from the extracted read command and the extracted write payload.

BRIEF DESCRIPTION OF THE DRAWINGS

FIG. 5 is an example of a data structure and data of a storage unit of write access history according to the first embodiment of the present invention.

FIG. 6 is an example of a data structure and data of a storage unit of read access history according to the first embodiment of the present invention.

DETAILED DESCRIPTION

Figure 1:
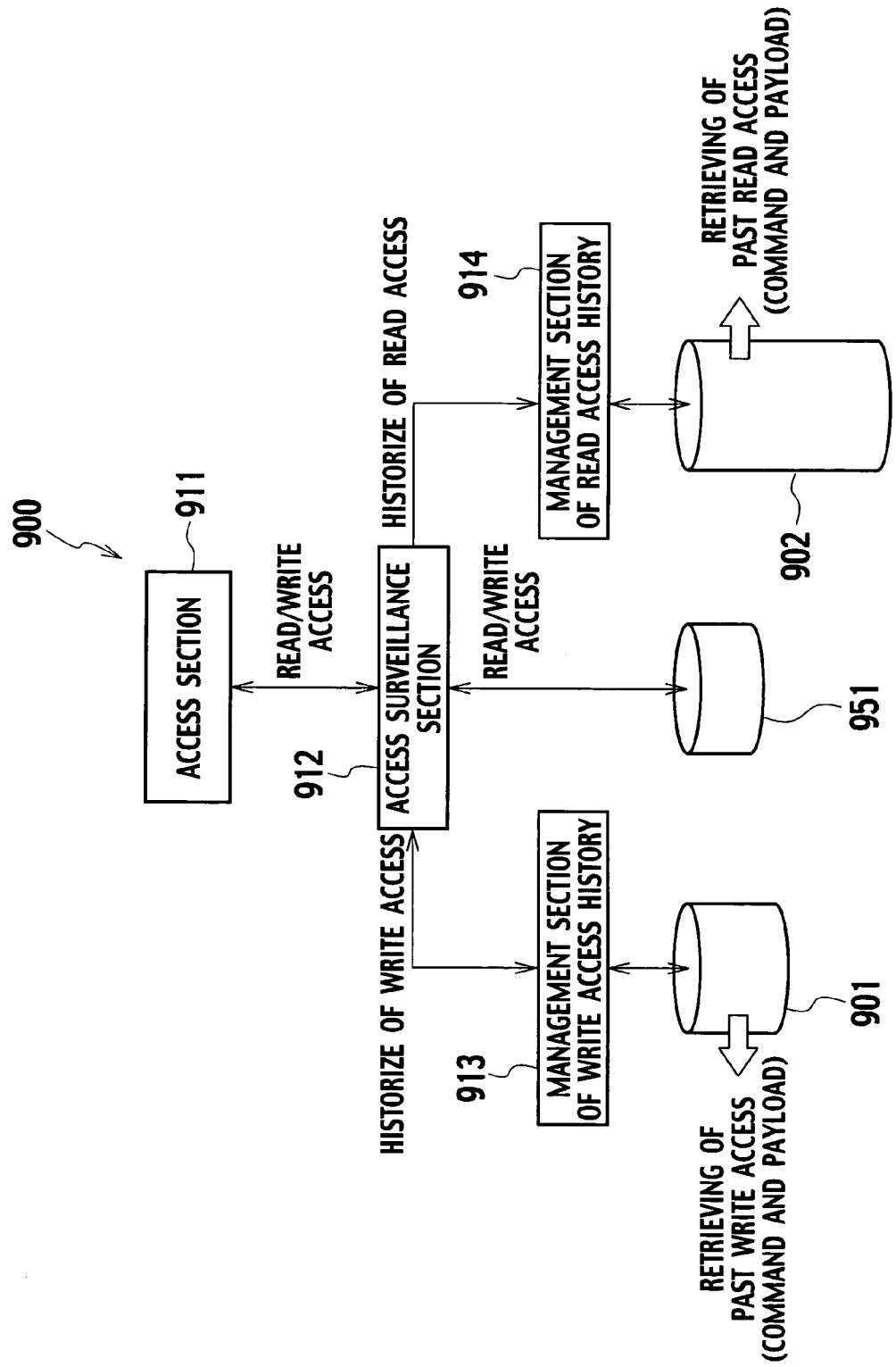
FIG. 1 is a functional block chart showing a conventional access history management apparatus.

Various embodiments of the present invention will be described herein below with reference to the accompanying drawings. It is to be noted that the same or similar reference numerals are applied to the same or similar parts and elements throughout the drawings.

An access history management method according to an embodiment of the present invention obtains a read access history for a target storage unit. The target storage unit stores target data to obtain access histories such as read accesses and write accesses executed by the access history management method according to the embodiment of the present invention. The target storage unit is, for example, a transistor memory and a magnetic disk unit, etc., and stores the digitalized data electrically.

Figure 2:
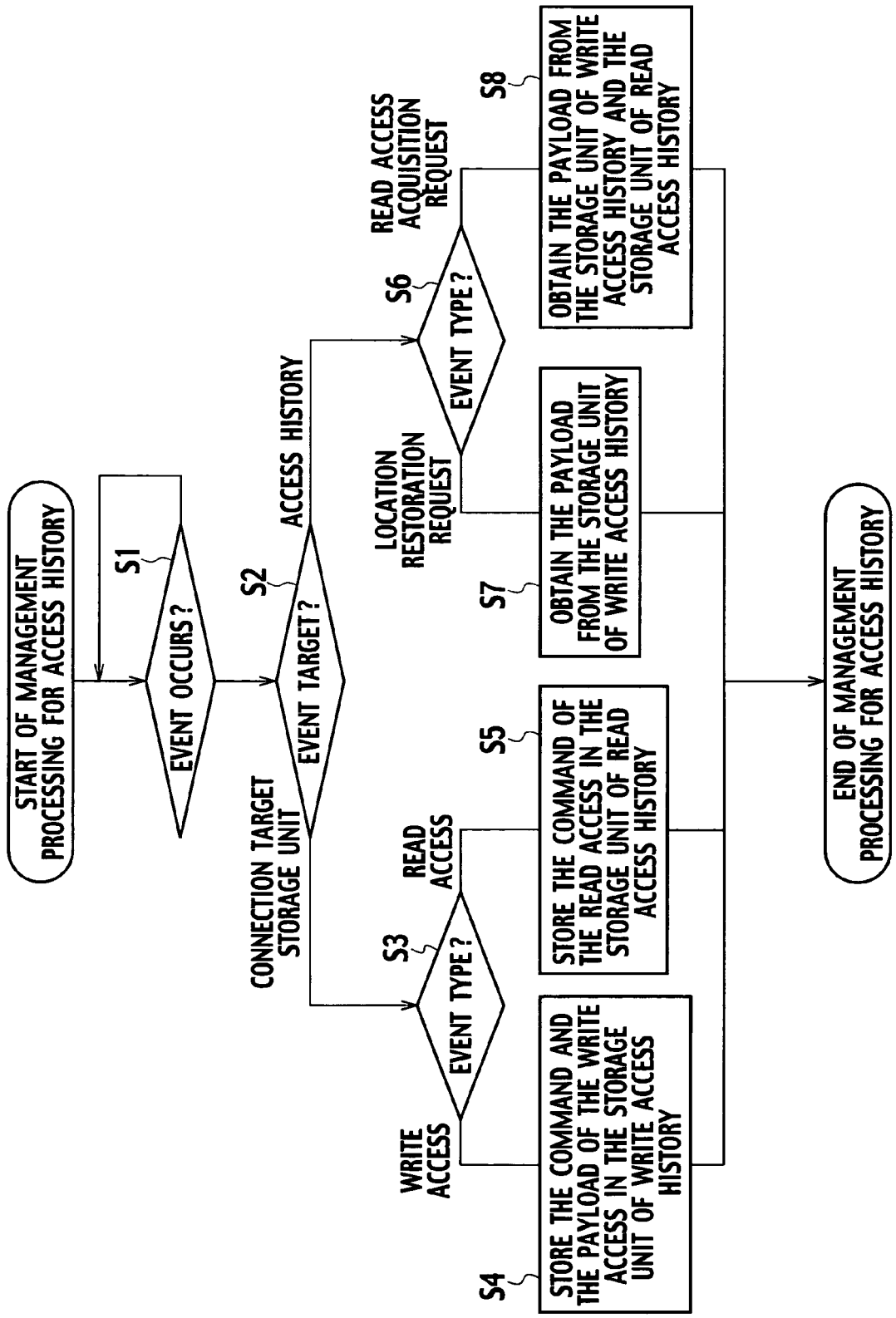
FIG. 2 is a flow chart for explaining process of an access history method according to an embodiment of the present invention.

The access history management method according to the embodiment of the present invention will be described referring to FIG. 2.

First of all, in Step S1, the event for the target storage unit is waited. When the event occurs, the process is executed according to the target of the event in Step S2.

If the occurring event is determined as the event to the target storage unit in Step S2, the process is executed according to the type of the event in Step S3. If the occurring event is a write access for the target storage unit, a command and a payload of the write access are stored in a storage unit of write access history in Step S4. Here, the command of the write access includes write time when the write access occurred, a write address, write data size, response time, and a result, etc.

The payload is data stored newly at the write address included in the command of the write access in the target storage unit.

If the occurring event is a read access for the target storage unit, a command of the read access is stored in s storage unit of read access history in Step S5. Here, the command of the read access includes read time when the read access occurred, a read address, read data size, response time, and a result, etc. The payload of the read access is not recorded and only the command of the read access is stored in this storage unit of read access history. Here, the payload is data stored, specifically, at the read address included in the command of the read access in the target storage unit.

On the other hand, if the occurring event is determined as the event to the access history in Step S2, a process is executed according to the type of the event, and the access history is output in Step S6 on the basis of information obtained in Step S4 and Step S5.

If the occurring event is a location restoration request in predetermined time and a predetermined address of the target storage unit, a write payload associated with a request address included in the location restoration request soonest before the request time included in the location restoration request is extracted from the storage unit of write access history in Step S7.

If the occurring event is a read access acquisition request occurred at predetermined time, the payload is extracted from the storage unit of write access history and the storage unit of read access history in Step S8. More specifically, the read command related at the request time included in the read access acquisition request is extracted from the storage unit of read access history. Next, write time soonest before the request time and the write payload associated with the read address included in the extracted read command are extracted from the appending section of write access history. In addition, read access information generated from the extracted read command and the extracted write payload is output.

Figure 3:
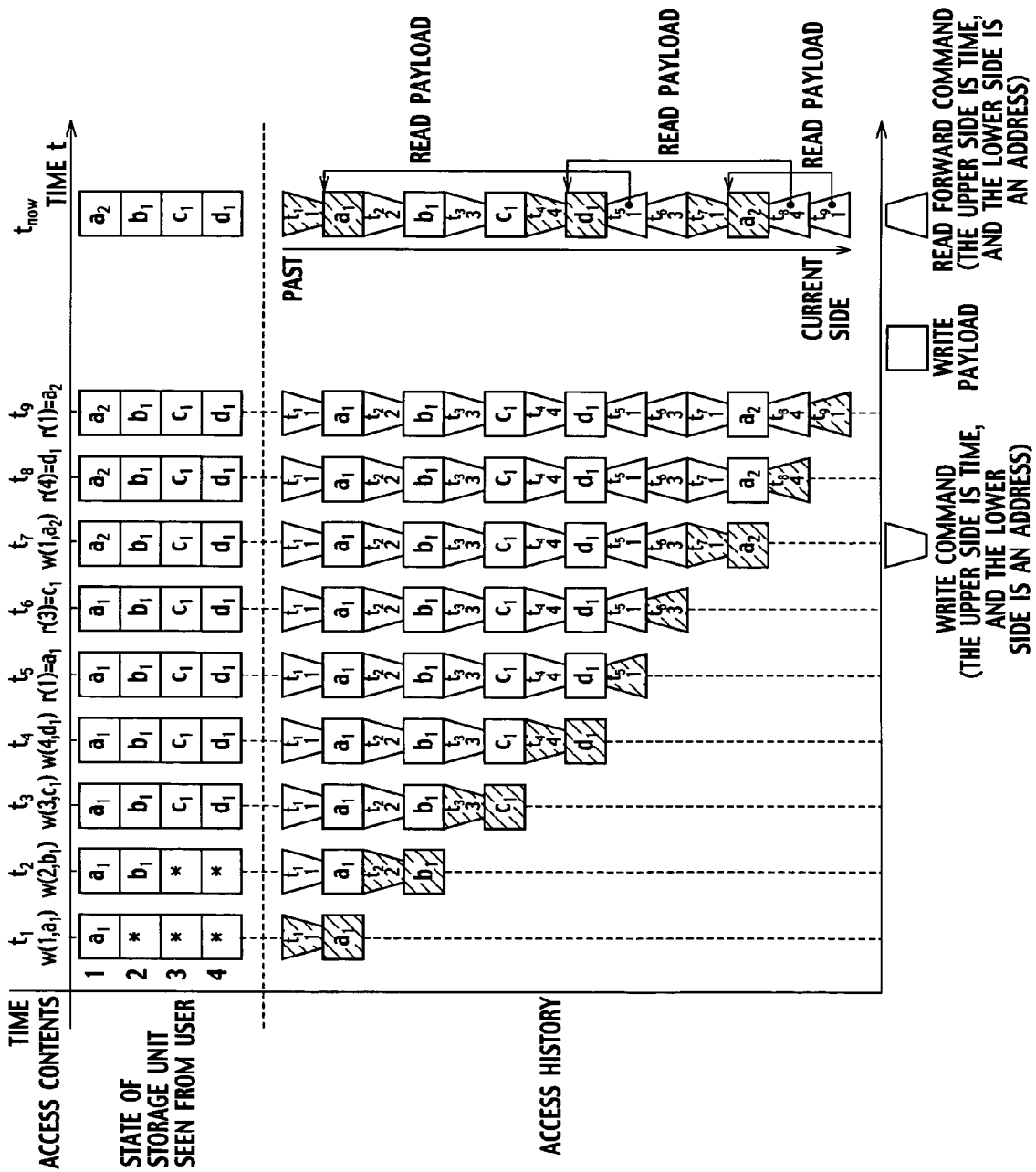
FIG. 3 is an illustration for explaining the access history management method according to the embodiment of the present invention.

In the example of showing in FIG. 3, the access that occurs in time $t_1$ to $t_9$ is described for the address space at address 1 to the address 4.

More specifically, data $a_1$ is written to address 1 at time $t_1$. Data $b_1$ is written to address 2 at time $t_2$. Data $c_1$ is written to address 3 at time $t_3$. Data $d_1$ is written to address 4 at time $t_4$. Address 1 is read at time $t_5$. Address 3 is read at time $t_6$. Data $a_2$ is written to address 1 at time $t_7$. Address 4 is read at time $t_8$. Address 1 is read at time $t_9$.

In this case, the write access occurred at time $t_1$ to $t_4$ time and time $t_7$ is stored in the storage unit of write access history according to the access history management method according to the embodiment of the present invention. The read access that occurred at time $t_5$, time $t_6$, time $t_8$, and time $t_9$ is stored in the storage unit of read access history.

At this time, in the case where the data obtained by the read access occurred at time $t_5$ is restored will be described. Since this read access is an access of the read for address 1, it is obtained from the payload of the write access occurred for address 1 soonest before time $t_5$. Here, payload $a_1$ of the write access at time $t_1$ is the data obtained by the read access occurred at time $t_5$. Similarly, the data obtained by the read access occurred at time $t_6$ is payload $c1$ of the write access occurred at time $t_3$. The data obtained by the read access occurred at time $t_8$ is payload $d_1$ of the write access occurred at time $t_4$. The data obtained by the read access occurred at time $t_9$ is payload $a_2$ of the write access occurred at time $t_7$.

For example, the command for the target storage unit is defined in formula 1 as structure "command", and is defined in formula 2 as variable "payload", as follows:

```
struct command {                                              (1)
    boolean type;    /* Type of command (READ or WRITE) */
    time accesstime; /* Access time */
    integer address; /* Address in access destination */
}
byte *payload;   /* (Pointer to) Data row of payload */       (2)
``` where the variable "payload" may be defined as for data row of the entity.

In this case, the command occurred for the target storage unit at time $t_1$ is expressed by formula 3, as follows:

$$command.type = WRITE$$
$$command.accesstime = t1$$
$$command.address = 1$$
$$payload = a1. \qquad (3)$$

In the case where the payload of the read access occurred at time $t_5$ is obtained on the basis of the storage unit of write access history accumulated in this manner, it is searched by conditional equation shown by formula 4, as follows:

$$command.type = WRITE \text{ and}$$
$$command.address = 1 \text{ and}$$
$$command.accesstime < t5. \qquad (4)$$

The storage unit of write access history is searched for "command.accesstime" to the descending order (that is, toward past from time $t_5$) sequentially on the basis of the conditional equation shown in formula 4, and what firstly hits is assumed to be a search result. As a result, the result shown in formula 5 is output, as follows:

$$payload = a1. \qquad (5)$$

In this manner, the payload of the read command is extracted from the storage unit of write access history without storing the payload of the read command, according to the access history management method by the embodiment of the present invention. Therefore, even if the history of the read command is stored, a large amount of storing capacity is not needed. In this manner, according to the access history management method by the embodiment of the present invention, all the histories of the read access and the write access for the target storage unit can be output.

Next, various embodiments of the access history management method according to the present invention will be described referring to a first embodiment to a sixth embodiment.

FIRST EMBODIMENT

In the first embodiment of the present invention, an example of applying the access history management method according to the embodiment of the present invention to an access history management apparatus 100, and mounting a target storage unit on a target unit 150 which is externally built on an access history management apparatus 100 will be described.

Figure 4:
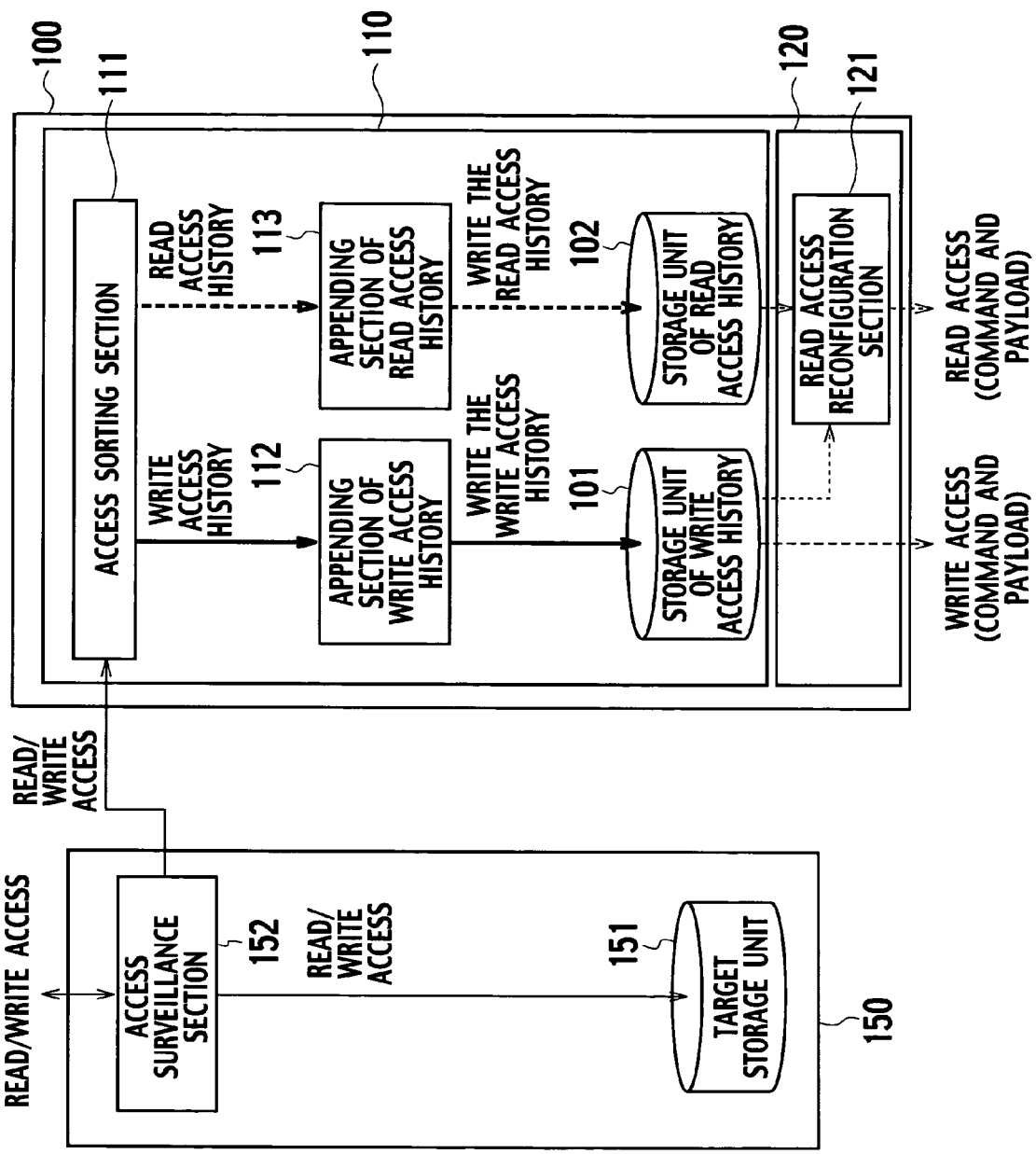
FIG. 4 is a functional block chart showing an access history management apparatus according to a first embodiment of the present invention.

As shown in FIG. 4, the target unit 150 according to the first embodiment of the present invention includes a target storage unit 151 and an access surveillance section 152.

The target storage unit 151 is a storage unit of the target from which the access histories such as the read access and the write access are obtained by the access history management apparatus 100 according to the first embodiment of the present invention. The target storage unit 151 is a semiconductor memory unit, a magnetic disk unit, etc., and is the unit for storing the digitalized data electrically. The target storage unit 151 according to the first embodiment includes neither a function of access storing collection nor a retrieving function.

The access surveillance section 152 hooks occurring of the read access or the write access for the target storage unit 151, and transmits the command etc. of the read access and the write access to the access history management apparatus 100.

The access history management apparatus 100 obtains the history of the read access for the target storage unit 151 included in the target unit 150.

As shown to FIG. 4, the access history management apparatus 100 according to the first embodiment of the present invention includes a storage unit of write access history 101, a storage unit of read access history 102, a history collection section 110, and a history retrieving section 120.

The history of the write access which occurs in the target storage unit 151 is stored in the storage unit of write access history 101. For example, as shown in FIG. 5, the storage unit of write access history 101 includes the item of a write address, a command type and write time as a command of the write access. In addition, the storage unit of write access history 101 is related to data stored in this write address at this write time as the payload. The data shown in FIG. 5 shows the history of the access to the target storage unit 151 as shown in FIG. 3. The write access occurred in data $a_1$ for address 1 at time $t_1$ is stored in a first record of the storage unit of write access history 101.

The history of the read access which occurs in the target storage unit 151 is stored in the storage unit of read access history 102. For example, as shown in FIG. 6, the storage unit of read access history 102 includes the item of a command type, read time and a read address as a command of the read access. The data shown in FIG. 6 shows the history of the access to the target storage unit 151 as shown in FIG. 3. The read access occurred for address 1 at time $t_5$ is stored in a first record of the storage unit of read access history 102.

In the example shown in FIG. 4, although the storage unit of write access history 101 and the storage unit of read access history 102 are described the example of mounting on the different storage unit, they may be mounted physically on the same storage unit.

The history collection section 110 includes an access sorting section 111, an appending section of write access history 112, and an appending section of read access history 113. The history collection section 110 sorts the process executed by the access sorting section 111 according to the access type which occurs in the target unit 150. In addition, the history collection section 110 stores only a command in the case of the read access and stores the command and the payload in the vase of the write access to be historize, by the appending section of write access history 112 or the appending section of read access history 113.

When what the access is occurred is notified from the access surveillance section 152, the access sorting section 111 sorts the process to either of the appending section of write access history 112 or the appending section of read access history 113 according to the access type of the read access or the write access. In addition, the access surveillance section 152 monitors the read access and the write access to the target storage unit 151 which does not have the function of the access storing collection and the retrieving function.

When the write access to the target storage unit 151 occurs, the appending section of write access history 112 stores the write command including the write time and the write address of the write access and the write payload in the storage unit of write access history 101. At this time, the appending section of write access history 112 may store all items included in the write command in the storage unit of write access history 101.

When the read access to target storage unit 151 occurs, the appending section of read access history 113 stores the read command including the read time and the read address of the read access in the storage unit of read access history 102. At this time, the appending section of read access history 113 may store all items included in the read command in the storage unit of read access history 102. However, the payload included in the response for the read command (more specifically, data of the target storage unit 151 read out by the read command) is not stored in the storage unit of read access history 102.

The history retrieving section 120 includes a read access reconfiguration section 121. When the write access of past is retrieved, the history retrieving section 120 retrieves the command and the payload directly from the storage unit of write access history 101. On the other hand, when the read access of past is retrieved, the history retrieving section 120 reconstructs the payload of the read access executed by the read access reconfiguration section 121 from the storage unit of read access history 102 which stores only the command of the read access by referring to the storage unit of write access history 101 which stores the command and the payload of the write access, and then retrieves the command and the payload.

When a read access acquisition request is input, the read access reconfiguration section 121 extracts the read command related to the request time included in the read access acquisition request from the storage unit of read access history 102. Here, the read access acquisition request is a process which requests read access information including the read address of the read access occurred at predetermined time and the payload. In addition, the read access reconfiguration section 121 extracts the write payload associated with the read address included in the read command extracted from the storage unit of write access history 101 soonest before the request time. In addition, the read access reconfiguration section 121 generates read access information from the extracted read command and the extracted write payload, and then outputs the read access information.

Figure 7:
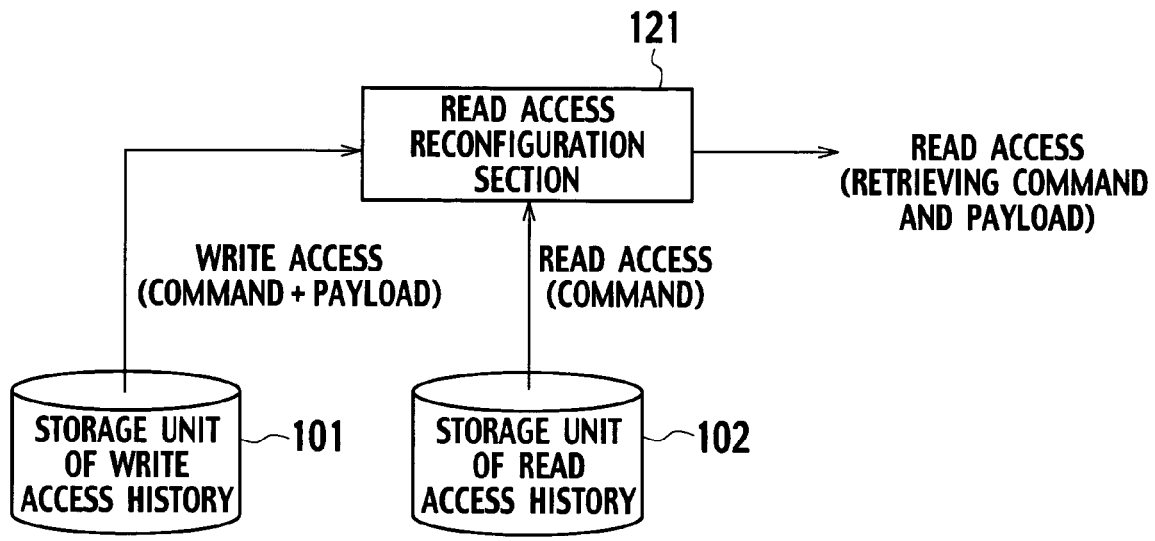
FIG. 7 is an illustration for explaining a read access reconfiguration section according to the first embodiment of the present invention.

As shown to FIG. 7, the read access reconfiguration section 121 inputs history of the write access which includes the command and the payload (write access history) and history of the read access which consists only of the command (read access history) reconstructs the payload of the read access, and then outputs the command and the payload of the read access.

Figure 8:
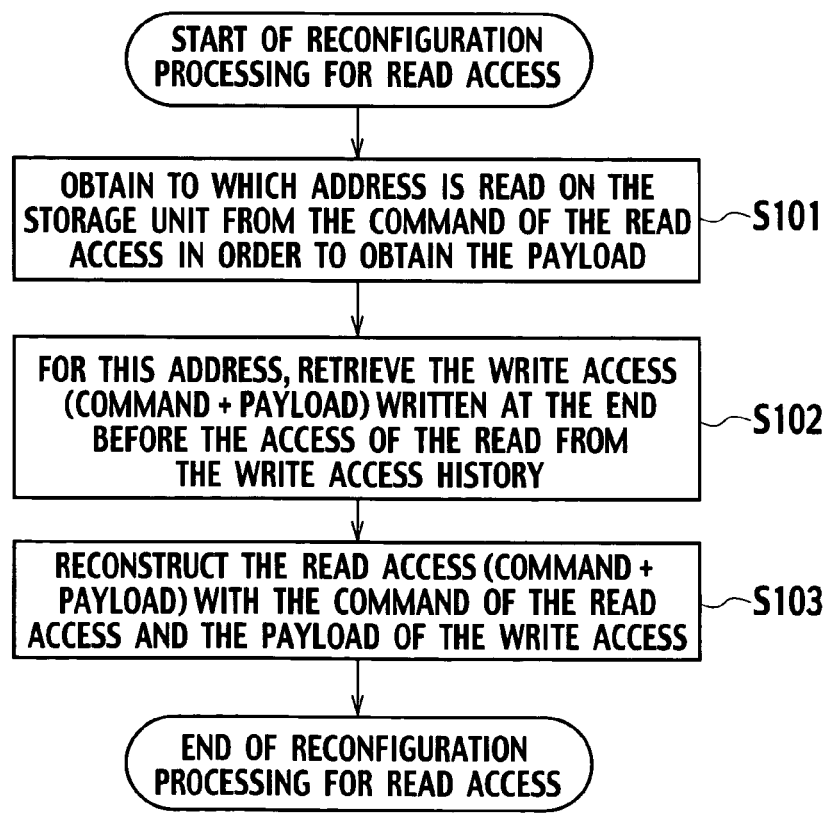
FIG. 8 is a flow chart for explaining a reconfiguration process for the read access executed by the read access reconfiguration section according to the first embodiment the present invention.

A reconfiguration processing for read access executed by the read access reconfiguration section 121 will be described referring to FIG. 8.

First of all, when the read access acquisition request is input, the request time is extracted from the read access acquisition request in Step S101. In addition, it is obtained to which address is read on the target storage unit 151 from the command of the read access to obtain the payload, among the commands stored in the storage unit of read access history 102. More specifically, the read address associated at the extracted request time is obtained.

Next, for the address extracted at Step S101, the write access which writes at the end before request time of the read access occurred is retrieved from the storage unit of write access history 101 in Step S102.

In Step S103, the read access information is reconstructed with the command of the read access extracted at Step S101 and the payload of the write access extracted at Step S102.

In this manner, according to the access history management apparatus of the first embodiment, the process of the read access or the write access for the target storage unit 151 detected by the access surveillance section 152 is sorted by the access sorting section 111 on the basis of the access type. For example, data is accumulated such as the structure shown in FIG. 5 or FIG. 6 by the appending section of write access history 112 or the appending section of read access history 113.

As a result, even if the payload of the read access is not stored as the historical information, the historical information of the read access can be composed of the historical information of the write access. Therefore, according to the access history management apparatus 100 of the first embodiment, all the histories of the read access can be stored without huge storing capacity.

SECOND EMBODIMENT

Figure 9:
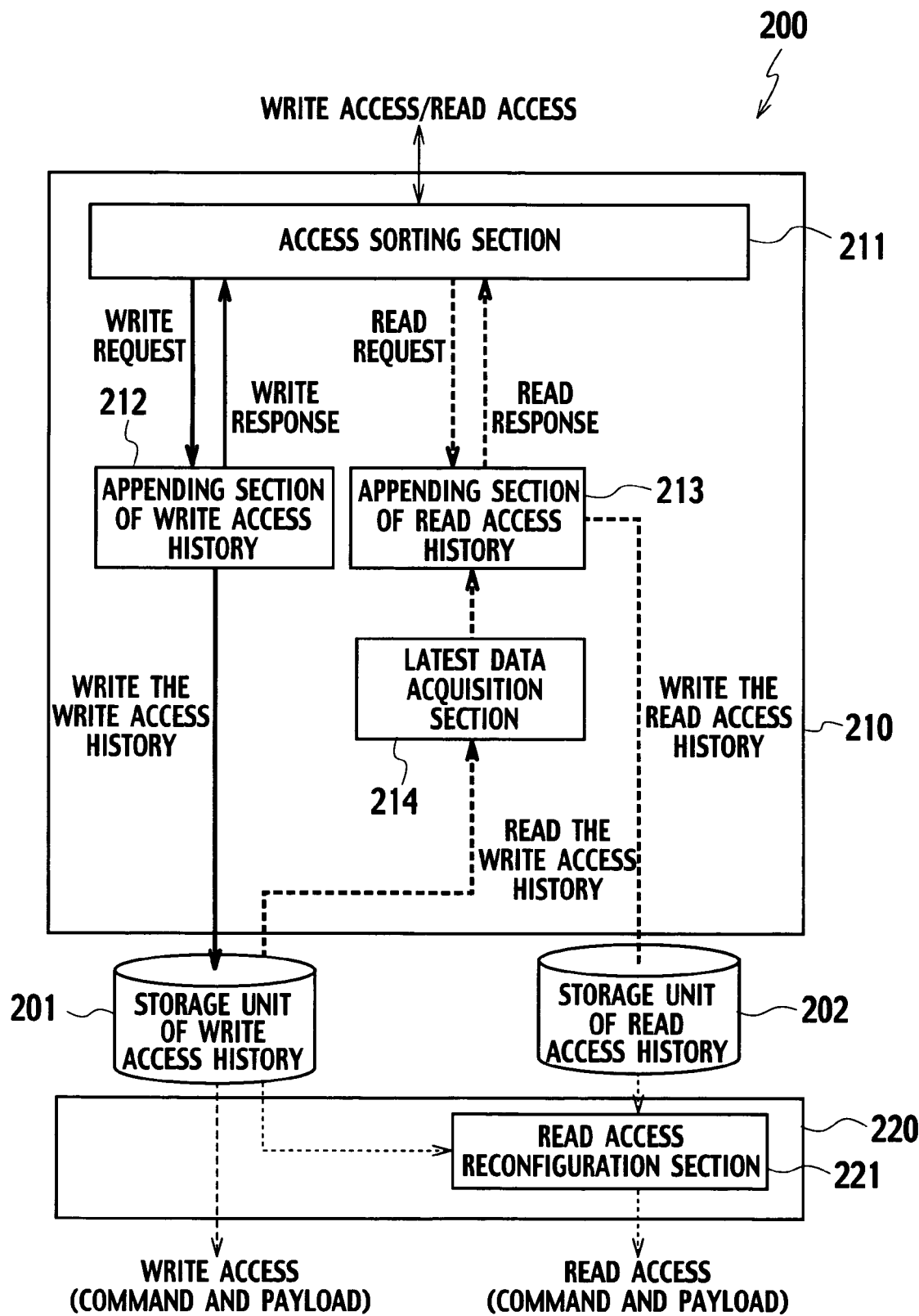
FIG. 9 is a functional block chart showing a storage unit according to a second embodiment of the present invention.

In the second embodiment of the present invention, it will describe when the access history management method according to the embodiment of the present invention is applied to a storage unit 200 shown in FIG. 9. In the second embodiment, the storage unit 200 to obtain the access history doesn't include a storage unit to which the latest data is stored. When the access to the storage unit 200 occurs, a response is generated from a storage unit of write access history 201 and a storage unit of read access history 202.

The storage unit 200 includes the storage unit of write access history 201, the storage unit of read access history 202, and a control program storage unit which stores a control program (firmware) realizable predetermined process. The correlation shown in FIG. 9 is achieved by the control program stored in the control program storage unit being mounted on the storage unit 200.

As for the storage unit 200 according to the second embodiment, a log (appending) structural recording mode is adopted. As a result, since a history region of the write access history and a storage area of storage unit 200 (log data) are consolidated to one, a necessary storage area can be reduced.

In the log structural recording mode, for example, the log structural file system, write data is not overwrited in old data but is recorded with appending (logging). Therefore, the write data is also called log data. Since "Appending" is a sequential write while "Overwriting" is a random write, the improvement of the ability of write accessibility can be attempted in the log structural recording mode. On the other hand, when the read accessing, it searches for data when the write access is executed to an address of the read target from among the log data at the end, and this is responded as the read data. Since the write data is recorded by the appending structure, it is possible to retrieve the past arbitrary write data consequentially.

As shown in FIG. 9, the storage unit 200 according to the second embodiment includes the storage unit of write access history 201, the storage unit of read access history 202, a storage unit providing section with built-in history collection function 210, and a history retrieving section 220.

The storage unit of write access history 201 is similar to the storage unit of write access history 101 of the first embodiment. The storage unit of read access history 202 is similar to the storage unit of read access history 102 of the first embodiment.

The storage unit providing section with built-in history collection function 210 provides a function similar to the target storage unit 151 and the history collection section 110 according to the first embodiment. The storage unit providing section with built-in history collection function 210 includes an access sorting section 211, an appending section of write access history 212, an appending section of read access history 213, and a latest data acquisition section 214.

When an access to the storage unit 200 occurs, the access sorting section 211 sorts a process to either of the appending section of write access history 212 or the appending section of read access history 213 according to the access type of the read access or the write access.

When a write access to the storage unit 200 occurs, the appending section of write access history 212 stores the write command including write time and a write address of the write access and the write payload in the storage unit of write access history 201. In addition, the appending section of write access history 212 outputs a response to the write access.

When a read access to the storage unit 200 occurs, the appending section of read access history 213 stores the read command including read time and a read address of the read access in the storage unit of read access history 202.

The latest data acquisition section 214 outputs the payload related to the latest write time to each address from the storage unit of write access history 201 as a read access response. In addition, when the latest data is obtained from the storage unit of write access history 201 by the latest data acquisition section 214, it is stored that the latest data is obtained by the appending section of read access history 213 in the storage unit of read access history 202.

The history retrieving section 220 includes a read access reconfiguration section 221. When a read access acquisition request is input, the read access reconfiguration section 221 extracts the read command related to request time included in the read access acquisition request from the storage unit of read access history 202. Next, the read access reconfiguration section 221 extracts write time soonest before the request time and the write payload associated to the read address included in the extracted read command from the storage unit of write access history 201. In addition, the read access reconfiguration section 221 generates read access information from the extracted read command and the extracted write payload.

Figure 10:
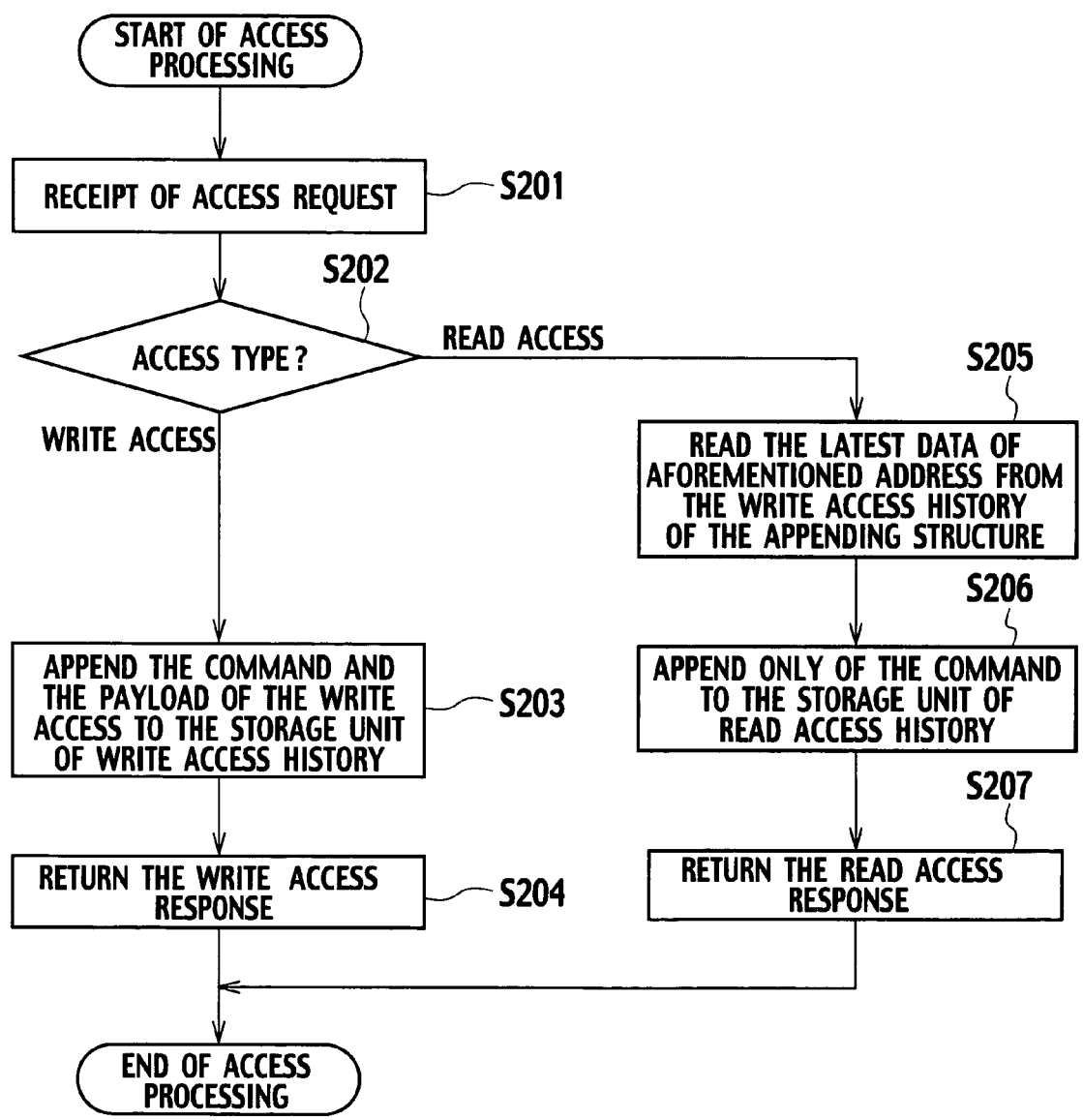
FIG. 10 is a flow chart for explaining an access process executed by a storage unit providing section with built-in history collection function 210 according to the second embodiment of the present invention.

Next, an access process executed by the storage unit providing section with built-in history collection function 210 according to the second embodiment will be described referring to FIG. 10.

First of all, if the access request is received by the access sorting section 211 in Step S201, the process is sorted by the type of the access in Step S202.

If determined that it is a write access in Step S202, the command and the payload of the write access are appended to the storage unit of write access history 201 in Step S203. Thereafter, a write access response is output in Step S204.

On the other hand, if determined that it is a read access in Step S202, latest data of aforementioned address is read from the storage unit of write access history 201 being the appending structure in Step S205. Next, only command of the read access is appended to the storage unit of read access history 202 in Step S206. Thereafter, a read access response including latest data of aforementioned address is output in Step S207.

In this manner, it is possible to think the write data (log data) of the log structural recording mode by the storage unit 200 to be the payload of the write access history described in the first embodiment. Therefore, it is possible to groom to the write access history by enhancing the log data of the log structural recording mode. In other words, the storage unit 200 according to the second embodiment can consolidate the log data of the log structural recording mode to the write access history. As a result, neither the storage area for the write access history nor the storage area of the storage unit 200 are separately prepared but the storage area of the storage unit can be held concurrently by one storage area for the write access history. Therefore, the reduction in a necessary as a whole memory capacity can be achieved.

THIRD EMBODIMENT

In the third embodiment of the present invention, the case where the access history management apparatus according to the first embodiment is applied to a target storage unit 351 which is a block device will be described. The block device is a device for inputting and outputting a data block composed from multiple bites as one unit.

The target storage unit 351 according to the third embodiment provides the block space which can be read and written freely. An access history management apparatus 300 historizes a read access and a write access for the block space of the target storage unit 351, and collects and retrieves data.

Figure 11:
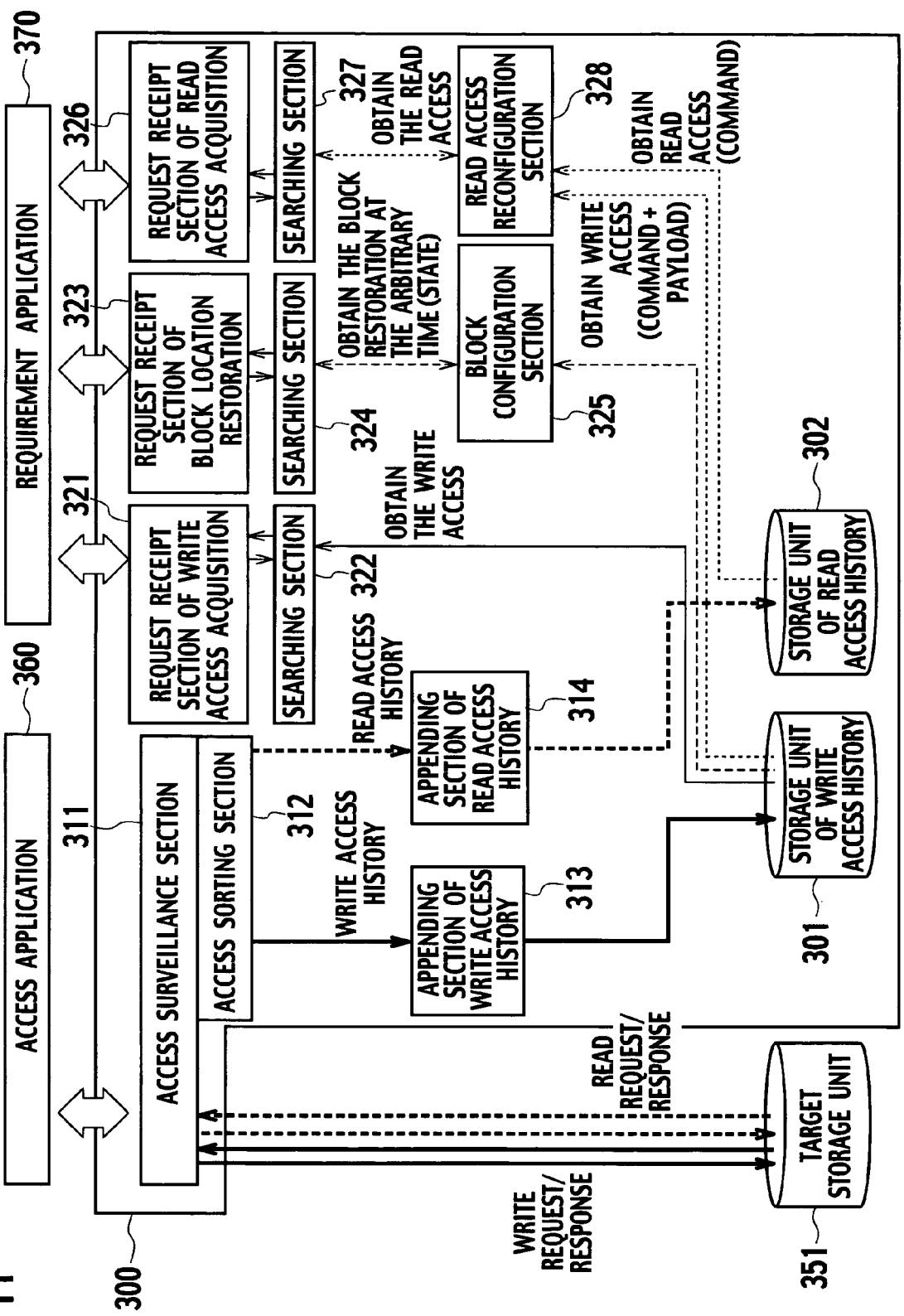
FIG. 11 is a functional block chart showing an access history management apparatus according to a third embodiment of the present invention.

As shown in FIG. 11, the Access history management apparatus 300 according to the third embodiment hooks the access from an access application 360 of a file system and a data base, etc. to the target storage unit 351, and stores the access history in a storage unit of write access history 301 and a storage unit of read access history 302. In addition, information such as the write access, block location, and the read accesses is provided according to the request from a requestment application 370 such as the surveillance application and the restore application, etc.

Access history management apparatus 300 includes the storage unit of write access history 301, the storage unit of read access history 302, an access surveillance section 311, an access sorting section 312, an appending section of write access history 313, an appending section of read access history 314, request receipt section of write access acquisition 321 and the first searching section 322, a request receipt section of block location restoration 323, a second searching section 324, a block configuration section 325, a request receipt section of read access acquisition 326, a third searching section 327, and a read access reconfiguration section 328.

The storage unit of write access history 301 and the storage unit of read access history 302 are similar to the storage unit of write access history 101 and the storage unit of read access history 102 of the first embodiment. However, since the target storage unit 351 according to the third embodiment is the block device, the read address and the write address indicate an address of the block device. The allocation method of disk drives of the storage unit of write access history 301 and the storage unit of read access history 302 is no object. More specifically, data stored in the target storage unit 351 and history data may be allocated to a separate disk drive, or may be allocated to a same disk drive.

The access surveillance section 311 is an interface of the block device, and processes to the access sorting section 312 when the access to the target storage unit 351 is hooked.

The access sorting section 312, the appending section of write access history 313, and the appending section of read access history 314 are respectively similar to the access sorting section 111, the appending section of write access history 112, and the appending section of read access history 113 of the first embodiment.

When a write access acquisition request to obtain write access information occurred at request time is input from the requestment application 370, the request receipt section of write access acquisition 321 instructs the first searching section 322 to obtain the write access according to the inputted write access acquisition request access.

Figure 12:
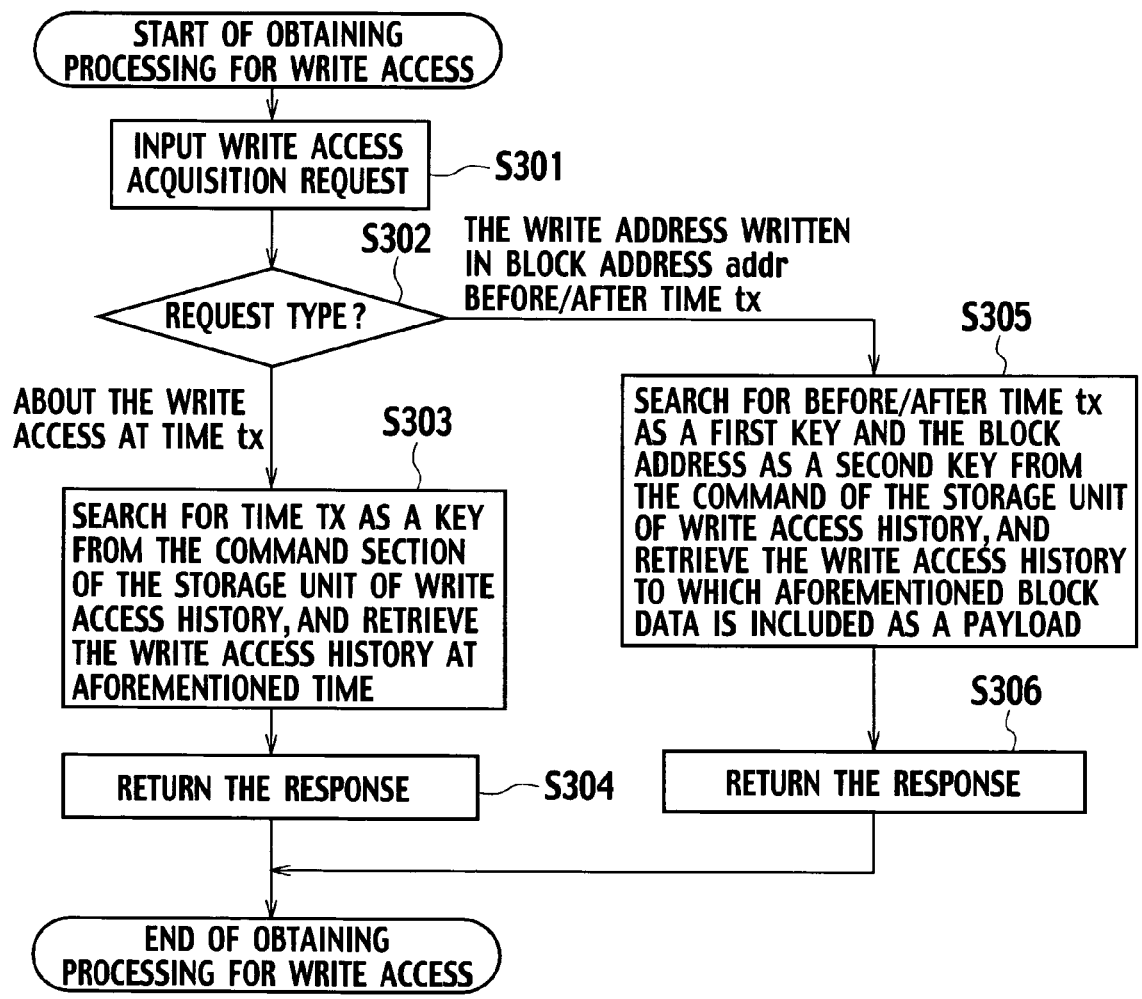
FIG. 12 is a flow chart for explaining a obtaining processing for write access according to the third embodiment of the present invention.

Next, an obtaining processing for write access executed by the request receipt section of write access acquisition 321 and the first searching section 322 will be described referring to FIG. 12. In FIG. 12, retrieving the write access occurred at time $t_x$ and retrieving the write access which writes to block address addr before or after time $t_x$ will be described.

First of all, when a write access acquisition request is input from the request receipt section of write access acquisition 321 in Step S301, the process is sorted according to the type of the input write access acquisition request in Step S302.

If information of the write access at time $t_x$ is obtained, the storage unit of write access history 301 is searched for write time $t_x$ as a key, and the write access history including time $t_x$ in the command is retrieved in Step S303. In Step S304, the write access history retrieved in Step S303 is responded to the requestment application 370.

On the other hand, if information of the write access which writes in block address addr before or after time $t_x$ is obtained, the storage unit of write access history 301 is searched for before or after time $t_x$ as a first key and for block address addr as a second key, and the write access history whose time of the command is before or after time $t_x$ and the write address is block address addr is retrieved. In Step S306, the payload of the write access retrieved by Step S305 as a block data is responded to the requestment application 370.

Besides the example of showing in FIG. 12, it is possible to achieve to retrieve the write access which writes block data blk as the payload before or after time $t_x$, etc.

When the restoration request for block location to restore the block location at the request time is input from the requestment application 370, the request receipt section of block location restoration 323 instructs the second searching section 324 to obtain block location according to the inputted restoration request for block location. At this time, the second searching section 324 instructs the block configuration section 325 to compose the location of the block according to the information stored in the storage unit of write access history 301. For example, in the case of restoring the block location at restoration request time, when the restoration request for block location including the restoration request time is input, the payload related soonest before the restoration request time is extracted from the storage unit of write access history 301 about each address of target storage unit 351, and the block location at the restoration request time is reconstructed.

Figure 13:
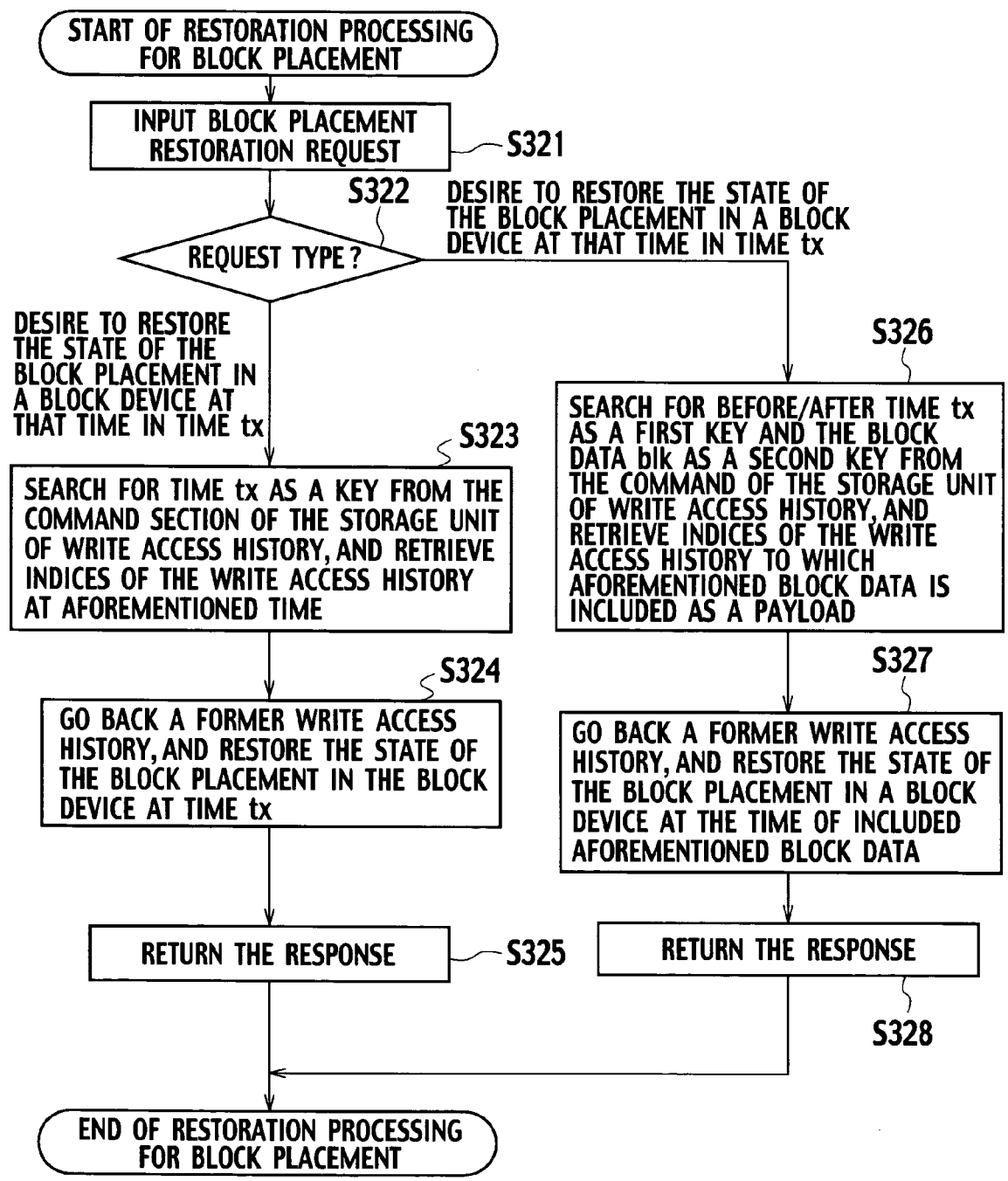
FIG. 13 is a flow chart for explaining a restoration processing for block location according to the third embodiment of the present invention.

Next, restoration processing for block location executed by the request receipt section of block location restoration 323, the second searching section 324, and the block configuration section 325 will be described referring to FIG. 13. In FIG. 13, reproduction of block space at time $t_x$ and reproduction of the block space $t_x$ including block data blk before and after time will be described.

First of all, when the restoration request for block location is input from the request receipt section of block location restoration 323 in Step S321, the process is sorted according to the type of the inputted restoration request for block location in Step S322.

If the block space at time $t_x$ is reproduced, the storage unit of write access history 301 is searched for time $t_x$ as a key, and indices of the write access history including time $t_x$ in the command are extracted in Step S323. Next, the state of the block location in the block device at time $t_x$ is restored by the write access history related at former time going back in Step S324. In Step S325, the state of the block location restored at Step S324 is responded to the requestment application 370.

On the other hand, if the block space including block data blk before and after time $t_x$ is reproduced, the storage unit of write access history 301 is searched for before or after time tx as a first key and for block data blk as a second key, and indices of the write access history whose time of the command is before or after time $t_x$ at and payload is block data blk are extracted. Next, the state of the block location in the target storage unit 351 included block data blk is restored in Step S327. In Step S328, the state of the block location restored in Step S327 is responded to the requestment application 370.

Besides the example of showing in FIG. 12, it is possible to achieve to reproduce the block space before or after the writing to block data blk before or after time $t_x$, reproduce the block space before or after the writing to block address addr before or after time $t_x$, reproduce the block space when block data blk is read before or after time $t_x$, and reproduce the block space when block address addr is read before or after time $t_x$, etc.

When the read access acquisition request to obtain read access information occurred at the request time is input from the requestment application 370, the request receipt section of read access acquisition 326 instructs the third searching section 327 to obtain the read access according to the inputted read access acquisition request. At this time, the third searching section 327 instructs the read access reconfiguration section 328 to compose read access information according to the information stored in the storage unit of write access history 301 and the storage unit of read access history 302.

Figure 14:
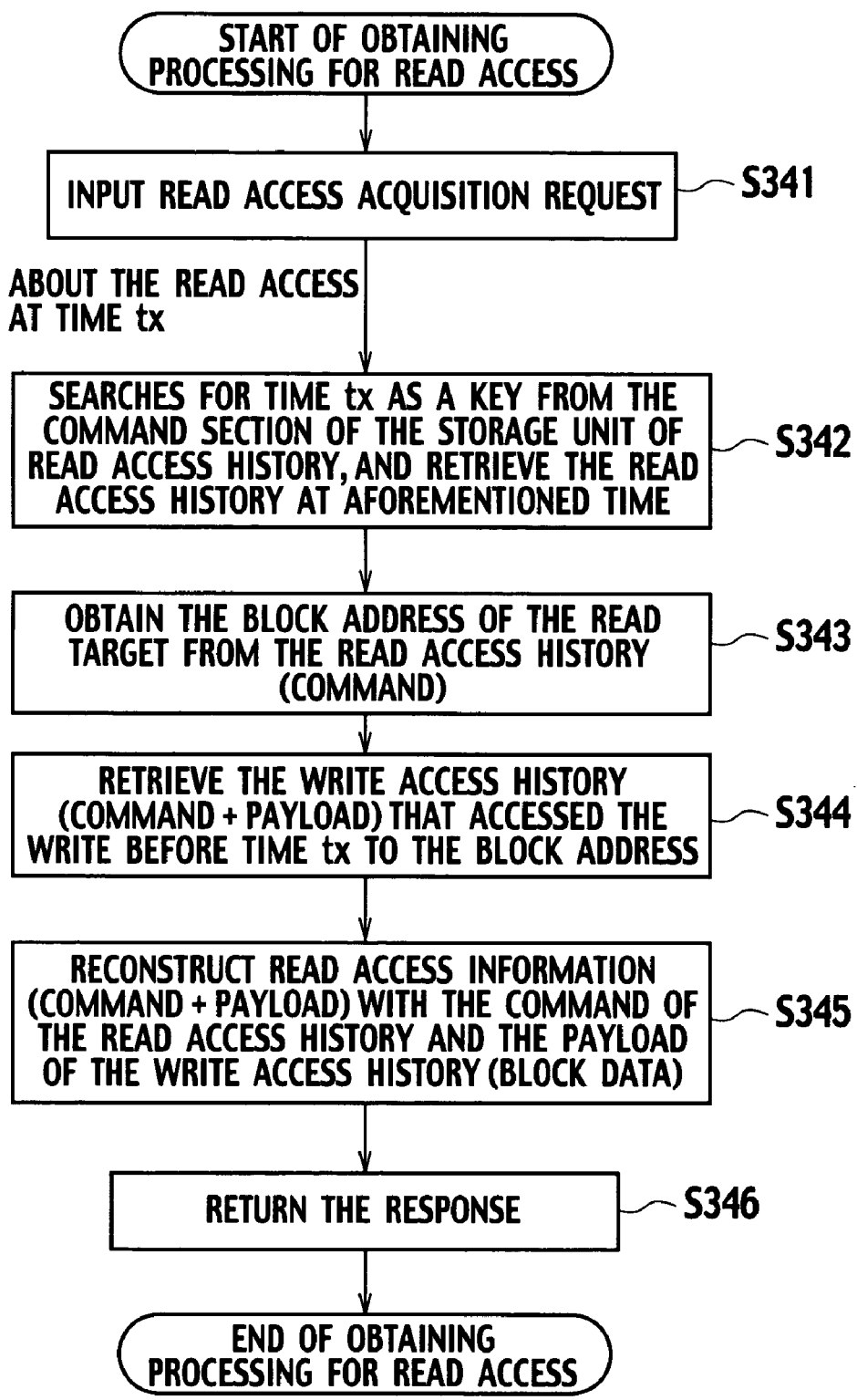
FIG. 14 is a flow chart for explaining a read access process according to the third embodiment of the present invention.

Next, an obtaining processing for read access executed by the request receipt section of read access acquisition 326 and the third searching section 327 and the read access reconfiguration section 328 will be described referring to FIG. 14. In FIG. 14, retrieving the read access at time $t_x$ will be described.

First of all, when the read access acquisition request at time $t_x$ is input from the request receipt section of read access acquisition 326 in Step S341, the storage unit of read access history 302 is searched for time $t_x$ as a key, the read access history of which time $t_x$ is included in the command is retrieved in Step S342. Thereafter, in Step S343, the block address of the read target is obtained from the read access history extracted at Step S342.

Next, in Step S344, the write access history written before time $t_x$ about the block address obtained at Step S343 is retrieved from the storage unit of write access history 301. In Step S345, read access information is reconstructed with the command of the read access obtained at Step S342 and the payload obtained at Step S345. In Step S346, the read access information reconstructed at Step S345 is responded to the requestment application 370.

Besides the example of showing in FIG. 14, it is possible to achieve to a read access which reads block data blk as the payload before and after time $t_x$, and a retrieving of the read access reading to block address addr before and after time $t_x$, etc.

In this manner, the access history management method according to the embodiment of the present invention is possible to adjust to the target storage unit 351 which is the block device.

FOURTH EMBODIMENT

Figure 15:
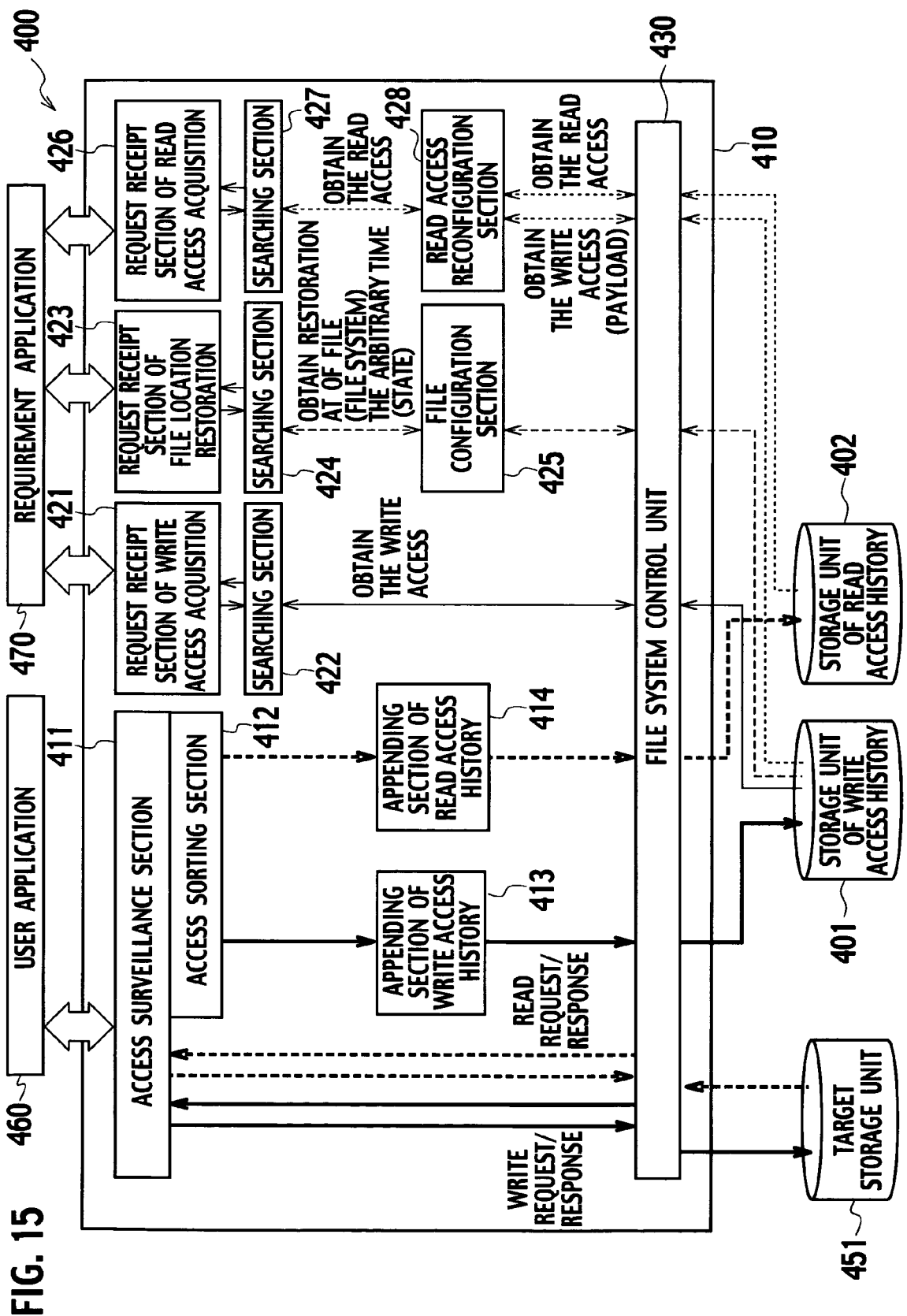
FIG. 15 is a functional block chart showing an information processing apparatus according to a fourth embodiment of the present invention.

In the fourth embodiment of the present invention, an information processing apparatus 400 of which the access history management method according to the embodiment of the present invention is applied to a file system of a general computer apparatus will be described referring to FIG. 15.

A file system section 410 provided in the information processing apparatus 400 is a file system which is an interface of the access from a user application 460 to a target storage unit 451. The file system section 410 includes an access surveillance section 411, an access sorting section 412, an appending section of write access history 413, an appending section of read access history 414, a request receipt section of write access acquisition 421, a first searching section 422, a request receipt section of file location restoration 423, a second searching section 424, a file configuration section 425, a request receipt section of read access acquisition 426, a third searching section 427, a read access reconfiguration section 428, and a system control section 430.

The request receipt section of file restoration 423, the second searching section 424 and the file configuration section 425 may be called a file location configuration section. The file location configuration section configured to search for the payload from the storage unit of write access history 401 for restoration request time as a key when the file location restoration request including the restoration request time is input. More specifically, when the restoration request for file location to restore the file location at the request time is input from the requestment application 470, the request receipt section of file location restoration 423 instructs the second searching section 424 to obtain file location according to the inputted restoration request for file location. At this time, the second searching section 424 instructs the file configuration section 425 to compose the location of the file according to the information stored in the storage unit of write access history 401. For example, in the case of restoring the file location at restoration request time, when the restoration request for file location including the restoration request time is input, the payload related soonest before the restoration request time is extracted from the storage unit of write access history 401 about each address of target storage unit 451, and the file location at the restoration request time is reconstructed.

The access surveillance section 411, the access sorting section 412, the appending section of write access history 413, the appending section of read access history 414, the request receipt section of write access acquisition 421, the first searching section 422, the request receipt section of file location restoration 423, the second searching section 424, the file configuration section 425, the request receipt section of read access acquisition 426 the third searching section 427 and the read access reconfiguration section 428 provide the function similar to the each function shown in FIG. 11. However, although the each function shown in FIG. 11 targets the block device, the each function shown in FIG. 15 is different the point intended for file system.

Therefore, the unit of the read access and the write access is not a unit of the block but a unit of the byte. And, one access is not an access to one block in a block address but an access to an arbitrary byte length from an arbitrary offset of an arbitrary file. Therefore, the payload of plural write histories might have to be combined in order to reproduce the payload of one read access history.

Moreover, the type of the access is not only the read or the write but also generate, delete, move, update of name, and initialize, etc. Therefore, for example, when the access of moving a file after the writing and reading the file at a certain time point is occurs, a history of the movement access of the file on the way should collect to obtain the payload of the read history from the payload of the write access history.

Therefore, not only the read access history and the write access history but also the access histories other than these should collect additionally when implementing the file system. As for this implementation approach, for example, the file tracking by the CVS is enumerated.

In this manner, the access history management method according to the embodiment of the present invention can adjust to the file system.

FIFTH EMBODIMENT

Figure 16:
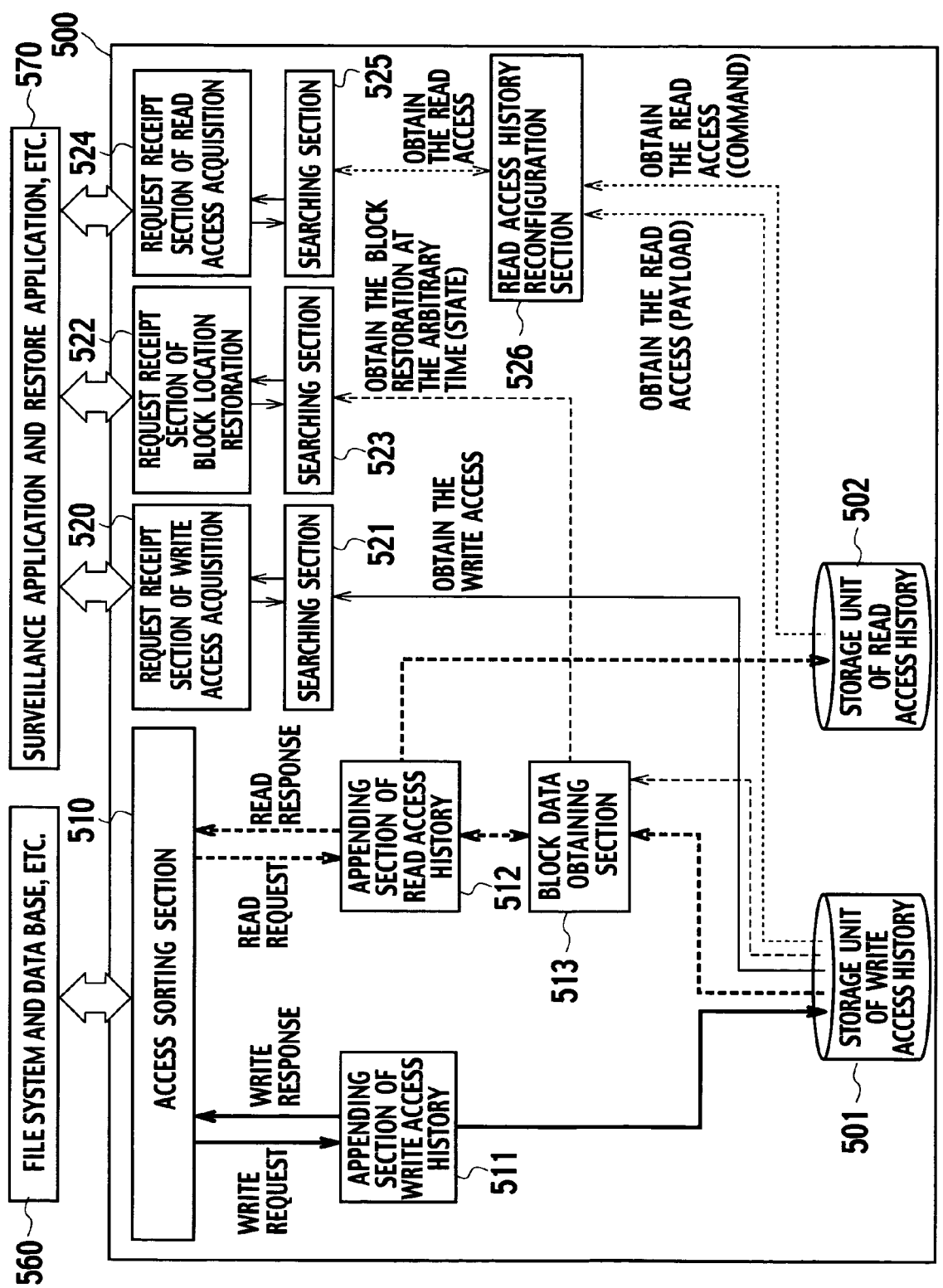
FIG. 16 is a functional block chart showing a storage unit according to a fifth embodiment of the present invention.

In the fifth embodiment of the present invention, the case where the second embodiment is applied to the block device as shown to FIG. 16 will be described.

A storage unit 500 according to the fifth embodiment includes a storage unit of write access history 501, a storage unit of read access history 502, and a control program storage unit which stores a control program (firmware) realizable the predetermined process. The correlation shown in FIG. 16 is achieved by the control program stored in the control program storage unit being mounted on the storage unit 500. Each function shown in FIG. 16 is similar to the each function described in the second embodiment and the third embodiment.

Here, an allocation method of a disk drive of the storage unit of write access history 501 and the storage unit of read access history 502 is no object. More specifically, these data may be allocated to a separate disk, may be allocated on the same disk separately, and may be allocated on the same disk at random.

SIXTH EMBODIMENT

Figure 17:
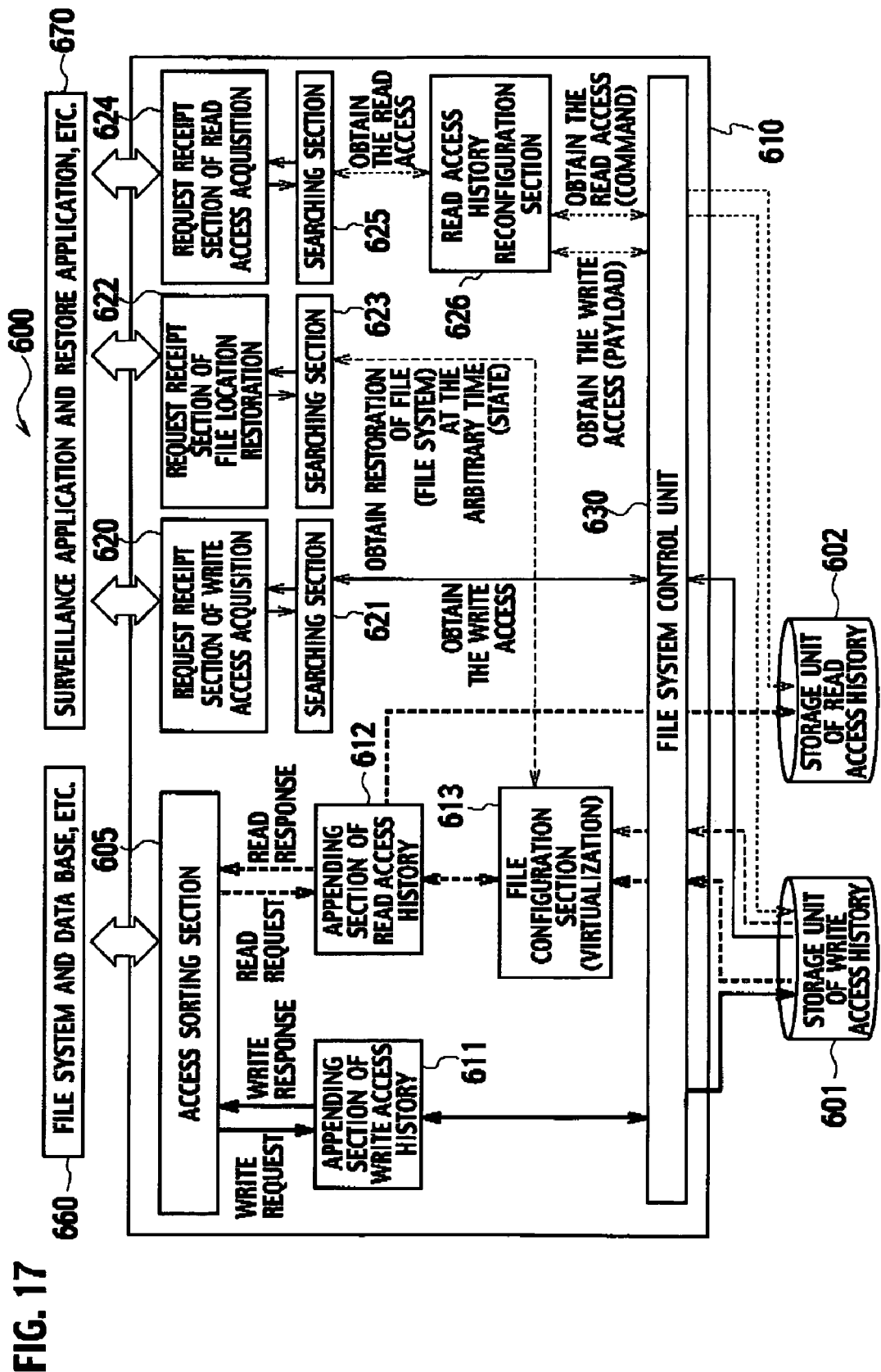
FIG. 17 is a functional block chart showing an information processing apparatus according to a sixth embodiment of the present invention.

As shown to FIG. 17, the sixth embodiment of the present invention is related to an information processing apparatus 600 to apply the second embodiment to a file system. Each function shown in FIG. 17 is similar to the each function described in the second embodiment and the forth embodiment. A file system section 610 provided in the information processing apparatus 600 is a file system which is the interface of the access from a user application 660.

Here, an allocation method of a disk drive of a storage unit of write access history 601 and a storage unit of read access history 602 is no object. More specifically, these data may be allocated to a separate disk, may be allocated on the same disk separately, and may be allocated on the same disk at random.

The request receipt section of file restoration 622, the second searching section 623 and the file configuration section 613 may be called a file location configuration section. The file location configuration section configured to search for the payload from the storage unit of write access history 601 for restoration request time as a key when the file location restoration request including the restoration request time is input. More specifically, when the restoration request for file location to restore the file location at the request time is input from the requestment application 670, the request receipt section of file location restoration 622 instructs the second searching section 623 to obtain file location according to the inputted restoration request for file location. At this time, the second searching section 623 instructs the file configuration section 613 to compose the location of the file according to the information stored in the storage unit of write access history 601. For example, in the case of restoring the file location at restoration request time, when the restoration request for file location including the restoration request time is input, the payload related soonest before the restoration request time is extracted from the storage unit of write access history 601 about each address, and the file location at the restoration request time is reconstructed. Here, if the restoration request time is now, the file configuration section 613 outputs the payload related to the latest write time to each address from the storage unit of write access history 601.

In addition, when the latest data is obtained from the storage unit of write access history 601 by the file configuration section 613, it is stored that the latest data is obtained by the appending section of read access history 612 in the storage unit of read access history 602.

SEVENTH EMBODIMENT

A seventh embodiment of the present invention is an example of applying the first embodiment and the second embodiment to an object device. The object device includes the interface such like the file system to the block device. In the representative example, there is an OSD (or OBSD; Object-Based Storage Devices, "SNIA working group", referring to URL: http://www.snia.org/tech_activities/workgroups/osd/).

Implementation with the object device according to the seventh embodiment is a base-on in the implementation technology to the block device shown in the third embodiment and the fifth embodiment. However, since the object device is different from the block device, the accesses of not only the read access and the write access but also open, delete, the collection definition or update and format, etc. exist. Therefore, these access histories also should collect additionally as well as the case of the file system shown in the fourth embodiment and the sixth embodiment in order to regenerate the payload of the read history from the payload of the write access history.

EIGHTH EMBODIMENT

In an eighth embodiment of the present invention, the access history management method according to the embodiment of the present invention is implemented on applications of a user application and a data base, etc. The eighth embodiment is achieved by changing the scope of the implementation technology to the file system shown in the fourth embodiment and the sixth embodiment. An operation history of various accesses (for example, read, write, open, delete, move, and update of name, etc.) is collected by not the file access unit but the application transaction unit.

OTHER EMBODIMENTS

Although the first to eighth embodiments of the present invention have been explained, the present invention may be embodied in other specific forms without departing from the spirit or essential characteristics thereof. A variety of alternative embodiments, implementation examples, and the operation techniques are clear for those skilled in the art from this disclosure.

For example, in the embodiments of the present invention, although the case where each history of the read access and the write access is stored in the different storage unit is described, each history may be stored in one storage unit.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A computer implemented method for management of access history in order to obtain read access history for a target storage unit, the computer implemented method comprising:

storing a write command including write time and a write address of write access and a write payload in a storage unit of write access history when the write access to the target storage unit occurs, wherein the write payload includes write data; and storing a read command including read time and read address of read access in a storage unit of read access history when the read access to the target storage unit occurs.

2. The computer implemented method of claim 1, further comprising:

extracting the read command related to request time included in a read access acquisition request from the storage unit of read access history when the read access acquisition request occurs;

extracting the write payload from an appending section of write access history, wherein the write payload is associated with the write time right before the request time and the read address included in the extracted read command; and outputting read access information generated from the extracted read command and the extracted write payload.

3. The computer implemented method of claim 1, further comprising:

extracting the write payload associated with a request address included in a location restoration request and the write time right before request time included in the location restoration request from an appending section of write access history when the location restoration request occurs; and outputting the extracted write payload.

4. An apparatus for management of access history in order to obtain read access history for a target storage unit, the apparatus comprising:

the target storage unit;

an appending section of write access history configured to store a write command including write time and a write address of write access and a write payload in a storage unit of write access history when the write access to the target storage unit occurs, wherein the write payload includes write data; and an appending section of read access history configured to store a read command including read time and read address of read access in a storage unit of read access history when the read access to the target storage unit occurs.

5. The apparatus of claim 4, further comprising:

a read access reconfiguration section configured to extract the read command related to request time included in a read access acquisition request from the storage unit of read access history when the read access acquisition request occurs, extract the write payload from the appending section of write access history, wherein the write payload is associated with the write time right before the request time and the read address included in the extracted read command, and then generate read access information from the extracted read command and the extracted write payload.

6. The apparatus of claim 4, further comprising:

a block location configuration section configured to extract the payload related to time right before restoration request time about each address of the target storage unit from the appending section of write access history when block location restoration request including the restoration request time is input, and then reconfigure block location at the restoration request time.

7. A computer executable program product for management of access history in order to obtain read access history for a target storage unit, the computer executable program when executed to perform the following steps:

storing a write command including write time and a write address of write access and a write payload in a storage unit of write access history when the write access to the target storage unit occurs, wherein the write payload includes write data; and storing a read command including read time and read address of read access in a storage unit of read access history when the read access to the target storage unit occurs.

8. The computer executable program product of claim 7, the computer executable program when executed to further perform the following steps:

extracting the read command related to request time included in a read access acquisition request from the storage unit of read access history when the read access acquisition request occurs;

extracting the write payload from an appending section of write access history, wherein the write payload is related to the write time right before the request time and the read address included in the extracted read command; and generating read access information from the extracted read command and the extracted write payload.

9. The computer executable program product of claim 7, the computer executable program when executed to further perform the following steps:

extracting the payload related to time right before restoration request time about each address of the target storage unit from the appending section of write access history when block location restoration request including the restoration request time is input, and then reconfiguring block location at the restoration request time.

10. A storage unit in order to obtain access history comprising:

a control program storage unit configured to store a control program realizable as firmware, the control program when executed to perform the following steps:

storing a write command including write time and a write address of write access and a write payload in a storage unit of write access history when the write access to the storage unit occurs, wherein the write payload includes write data; and storing a read command including read time and read address of read access in a storage unit of read access history when the read access to the storage unit occurs.

11. The storage unit of claim 10, the control program when executed to further perform the following steps:

extracting the read command related to request time included in a read access acquisition request from the storage unit of read access history when the read access acquisition request occurs;

extracting the write payload from an appending section of write access history, wherein the write payload is related to the write time right before the request time and the read address included in the extracted read command; and generating read access information from the extracted read command and the extracted write payload.

12. The storage unit of claim 11, the control program when executed to further perform the following steps:

outputting the payload related to latest write time from the storage unit of write access history as a read access response.

13. The storage unit of claim 10, wherein the storage unit is recorded by a log structural recording mode.

14. The storage unit of claim 10, the control program when executed to further perform the following steps:

extracting the payload related to time right before restoration request time about each address of the target storage unit from the appending section of write access history when block location restoration request including the restoration request time is input, and then reconfiguring block location at the restoration request time.

15. An information processing apparatus for management of file information of a target storage unit, the information processing apparatus including a file system section in order to obtain read access history, the file system section comprising:

an appending section of write access history configured to store an update command including update time and an update address of update access and an update payload in a storage unit of write access history when the update access to the target storage unit occurs, wherein the update payload includes update data;

an appending section of read access history configured to store a read command including read time and read address of read access in a storage unit of read access history when the read access to the target storage unit occurs; and a read access reconfiguration section configured to extract the read command related to request time from the storage unit of read access history when the read access acquisition request occurs, extract the update payload from the appending section of write access history, wherein the update payload is related to the write time right before the request time and the read address included in the extracted read command, and then generate read access information from the extracted read command and the extracted write payload.

16. The information processing apparatus of claim 15, the file system section further comprising:

a file location configuration section configured to search for the payload from the storage unit of write access history for restoration request time as a key when the block location restoration request including the restoration request time is input.

17. The information processing apparatus of claim 15, the information processing apparatus further comprising the target storage unit.

18. The information processing apparatus of claim 17, the file system section further comprising:

a file location configuration section configured to search for the payload from the storage unit of write access history for restoration request time as a key when the file location restoration request including the restoration request time is input.

* * * * *